United States Patent
Ono

(10) Patent No.: US 7,561,235 B2
(45) Date of Patent: Jul. 14, 2009

(54) LCD DEVICE HAVING COUNTER VOLTAGE SIGNAL LINE BETWEEN AND PARALLEL WITH PAIRS OF GATE SIGNAL LINES FORMED OVER COUNTER ELECTRODE WITH CONDUCTIVE LAYER FORMED OF AN EXTENDING PORTION THEREOF AT BOUNDARY PORTION OF ADJACENT PIXELS

(75) Inventor: Kikuo Ono, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 601 days.

(21) Appl. No.: 11/107,865

(22) Filed: Apr. 18, 2005

(65) Prior Publication Data

US 2005/0243255 A1 Nov. 3, 2005

(30) Foreign Application Priority Data

Apr. 20, 2004 (JP) ............................. 2004-123987

(51) Int. Cl.
*G02F 1/1343* (2006.01)
(52) U.S. Cl. ............................. 349/141; 349/38; 349/39
(58) Field of Classification Search ................. 349/138, 349/139, 141, 38, 39
See application file for complete search history.

(56) References Cited

U.S. PATENT DOCUMENTS 5,337,173 A * 8/1994 Atsumi et al. ................. 349/39
5,760,856 A 6/1998 Yanagawa et al.
6,760,082 B2 * 7/2004 Lee ............................. 349/42
7,292,302 B2 * 11/2007 Min et al. .................... 349/141
2005/0128407 A1 * 6/2005 Lee et al. .................... 349/141

FOREIGN PATENT DOCUMENTS

JP 09-080472 9/1995

* cited by examiner

*Primary Examiner*—David Nelms
*Assistant Examiner*—John Heyman
(74) *Attorney, Agent, or Firm*—Reed Smith LLP; Juan Carlos A. Marquez, Esq.

(57) ABSTRACT

The present invention provides a liquid crystal display device which can enhance a numerical aperture of pixels. A liquid crystal display device includes pixels which are arranged close to each other without having a signal line in a boundary on a substrate, and a counter electrode, an insulation layer and a pixel electrode which generates an electric field between the pixel electrode and the counter electrode which are sequentially stacked in each pixel. The pixel electrode is constituted of a plurality of electrodes which are arranged in parallel in a state that the electrodes are overlapped to the counter electrode and include portions which are arranged close to the pixel electrode of another neighboring pixel. A conductive layer is provided between a boundary portion of the pixels arranged close to each other and between a layer on which the pixel electrode is formed and the substrate. Further the conductive layer is electrically connected with the counter electrode and a height of a surface of the conductive layer from the substrate is set higher than a height of a surface of the counter electrode from the substrate.

2 Claims, 12 Drawing Sheets

LCD DEVICE HAVING COUNTER VOLTAGE SIGNAL LINE BETWEEN AND PARALLEL WITH PAIRS OF GATE SIGNAL LINES FORMED OVER COUNTER ELECTRODE WITH CONDUCTIVE LAYER FORMED OF AN EXTENDING PORTION THEREOF AT BOUNDARY PORTION OF ADJACENT PIXELS

CROSS-REFERENCE TO RELATED APPLICATIONS

The disclosure of Japanese Patent Application No. 2004-123987 filed on Apr. 20, 2004 including the specification, drawings and abstract is incorporated herein by reference in its entirety.

BACKGROUND OF THE INVENTION

The present invention relates to a liquid crystal display device, and more particularly to a liquid crystal display device which improves the pixel constitution thereof.

A so-called active-matrix-type liquid crystal display device is configured such that a pair of substrates are arranged to face each other in an opposed manner with liquid crystal therebetween, gate signal lines which are arranged in parallel and drain signal lines which are arranged in parallel in a state that the respective drain signal lines intersect the respective gate signal lines are mounted on a liquid-crystal-side surface of one of the respective substrates, and respective regions which are surrounded by the gate signal lines and the drain signal lines constitute the pixel regions.

That is, the liquid crystal display device is configured such that through a switching element which is turned on in response to a signal from one gate signal line out of the signal lines which surround a pixel, a signal from one drain signal line is supplied to a pixel electrode.

In view of the above-mentioned constitution, to focus an attention on two pixels which are arranged close to each other along the gate signal line, for example, a drain signal line runs between these gate signal lines (U.S. Pat. No. 5,760,856 (literature 1)).

However, to enhance the so-called numerical aperture of the pixel, there has been known the constitution in which on both sides of a region which is occupied by two pixels, respective drain signal lines which supply a signal to the respective pixels are arranged and the drain signal line is not arranged between the respective pixels (Japanese Patent Laid-open Hei09-80472 (literature 2)).

BRIEF SUMMARY OF THE INVENTION

However, with respect to the pixels having the above-mentioned constitution, the pixel electrodes are usually formed on the substrate side on which the respective signal lines are formed and hence, it is indispensable that the pixel electrodes of the above-mentioned two pixels have to be arranged also close to each other.

In this case, a following phenomenon has been found out. That is, in the constitution which sequentially laminates a counter electrode, an insulation film and a pixel electrode which generate an electric field between the pixel electrodes, when the counter electrode is formed in a state that the counter electrode strides over two pixel regions and substantially covers the whole region of these two pixel regions, and pixel electrodes of respective pixel regions are extended in one direction thus forming the pixel electrodes as a plurality of electrodes which are arranged in the direction which extends and intersects the above-mentioned one direction, a sufficient brightness level difference cannot be obtained in a boundary portion of the above-mentioned two pixel regions.

From the above-phenomenon, it has been also found out that there exists a limit with respect to the close arrangement of the above-mentioned pixel electrodes of two respective pixels and this hampers the acquisition of the sufficient numerical aperture.

The invention has been made under such circumstances and it is an object of the invention to provide a liquid crystal display device which can enhance a numerical aperture of pixels.

To briefly explain the summary of representative inventions among the inventions disclosed in this specification, they are as follows.

(1)

A liquid crystal display device according to the invention is, for example, characterized in that the liquid crystal display device includes pixels which are arranged close to each other without having a signal line in a boundary on a substrate, in each pixel, a counter electrode, an insulation layer and a pixel electrode which generates an electric field between the pixel electrode and the counter electrode are sequentially stacked, and the pixel electrode is constituted of a plurality of electrodes which are arranged in parallel in a state that the pixel electrodes are overlapped to the counter electrode and include portions which are arranged close to the pixel electrode of another pixel which is arranged close to the pixel, a conductive layer is provided in a boundary portion of the pixels arranged close to each other and between a layer on which the pixel electrode is formed and the substrate, and the conductive layer is electrically connected with the counter electrode and a height of a surface of the conductive layer from the substrate is set higher than a height of a surface of the counter electrode from the substrate.

(2)

The liquid crystal display device according to the invention is, for example, on the premise of the constitution shown in the constitution (1), characterized in that a counter voltage signal line which is formed in a state that the counter voltage signal line traverses the respective pixels is formed over the counter electrode in a state that the counter voltage signal line is brought into direct contact with the counter electrode, and the conductive layer is formed of an extending portion of the counter voltage signal line.

(3)

The liquid crystal display device according to the invention is, for example, on the premise of the constitution shown in the constitution (1), characterized in that a black matrix is formed over a liquid-crystal-side surface of another substrate which is arranged to face the substrate in an opposed manner with liquid crystal therebetween, wherein the black matrix is formed in a state that the black matrix surrounds the respective pixels without defining boundaries around the respective pixels.

(4)

The liquid crystal display device according to the invention is, for example, on the premise of the constitution shown in the constitution (1), characterized in that the pixel electrode of each pixel has a comb-teeth-shaped pattern in which the pixel electrode includes a plurality of electrodes which extend in the direction which intersects boundaries of the respective pixels and are arranged in parallel in the direction which intersects the direction, and the pixel electrodes are connected with each other on a side opposite to the boundaries of the respective pixels.

(5)

The liquid crystal display device according to the invention is, for example, on the premise of the constitution shown in the constitution (1), characterized in that the counter electrode and the pixel electrode are formed of a light-transmitting conductive film.

(6)

The liquid crystal display device according to the invention is, for example, on the premise of the constitution shown in the constitution (1), characterized in that two pixels which are arranged close to each other are provided to a region which is surrounded by a pair of drain signal lines and a pair of gate signal lines.

(7)

The liquid crystal display device according to the invention is, for example, on the premise of the constitution shown in the constitution (6), characterized in that a counter voltage signal line is provided between a pair of gate signal lines and in parallel with the gate signal lines, the counter voltage signal line is formed over the counter electrode, and the conductive layer is formed of an extending portion of the counter voltage signal line.

(8)

The liquid crystal display device according to the invention is, for example, on the premise of the constitution shown in the constitution (1), characterized in that four pixels which are arranged close to each other are provided to a region which is surrounded by a pair of drain signal lines and a pair of gate signal lines.

(9)

The liquid crystal display device according to the invention is, for example, on the premise of the constitution shown in the constitution (8), characterized in that a counter voltage signal line is provided between a pair of gate signal lines and in parallel with the gate signal lines, the counter voltage signal line is directly formed over the counter electrode, four pixels are defined into two groups each consisting of two pixels, and the conductive layer which is formed of an extending portion of the counter voltage signal line is formed in a boundary between two pixels of each group.

Here, the invention is not limited to the above-mentioned constitutions and various modifications can be made without departing from the technical concept of the invention.

The liquid crystal display device having such a constitution has no signal line in the boundary between the pixels arranged close to each other, and each pixel is formed by sequentially stacking the counter electrode, the insulation layer and the pixel electrode which generates the electric field between the pixel electrode and the counter electrode.

In this case, the pixel electrodes is constituted of the plurality of electrodes which are arranged in parallel in an overlapped manner over the counter electrode and hence, in an attempt to enhance the numerical aperture of the pixel, it is indispensable that the pixel electrode has a portion close to the pixel electrode of another pixel arranged close to the pixel electrode.

Accordingly, it is unavoidable that the electric field is generated between the pixel electrode of one pixel and the pixel electrode of another pixel thus giving rise to a drawback that the division of displays of respective pixels becomes obscure in the boundary between the pixels arranged close to each other.

In view of the above, in the invention, the conductive layer is formed in the boundary portion of the pixels arranged close to each other and between the layer on which the pixel electrode is formed and the substrate, the conductive layer is electrically connected with the counter electrode, and the height of the surface of the conductive layer from the substrate is set higher than the height of the surface of the counter electrode from the substrate.

That is, in the portion of the pixel electrode which is arranged close to another pixel, a portion where the electric field is generated in a concentrated manner is formed of the conductive layer at a portion closer than the counter electrode of another pixel whereby it is possible to avoid the generation of the electric field between the pixel electrode and the counter electrode of another pixel.

Accordingly, it is possible to make the division of the pixels in the boundary of the pixels arranged close to each other clear thus allowing the pixel electrode of one pixel to be arranged close to the pixel electrode of another pixel arranged close to the pixel.

DETAILED DESCRIPTION OF THE INVENTION

Hereinafter, embodiments of a liquid crystal display device according to the invention are explained in conjunction with attached drawings.

Figure 5:
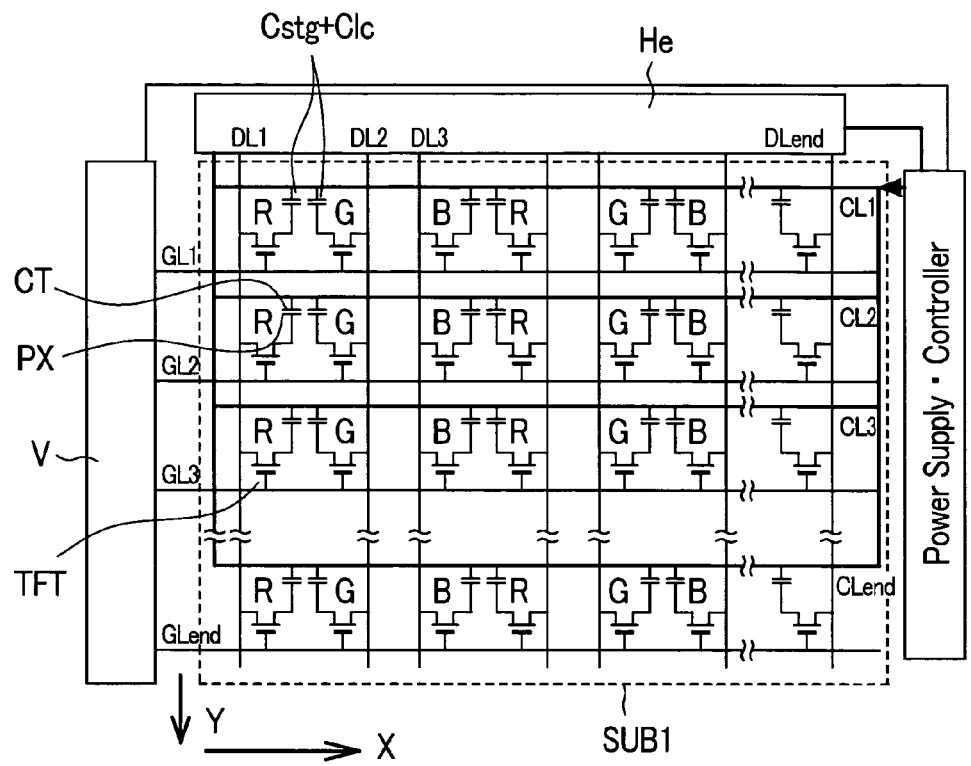
FIG. 5 is a view showing one embodiment of an equivalent circuit of the liquid crystal display device according to the invention.

FIG. 5 shows an equivalent circuit which is formed on a liquid-crystal-side surface of one transparent substrate SUB1 out of transparent substrates which are arranged to face each other with liquid crystal therebetween.

On the liquid-crystal-side surface of one transparent substrate SUB1, gate signal lines GL (GL1 to GLend) which extend in the x direction and are arranged in parallel in the y direction and drain signal lines DL (DL1 to DLend) which extend in the y direction and are arranged in parallel in the x direction are formed.

In this case, the drain signal lines DL are arranged at sequentially alternating intervals of a relatively large distance, a relatively small distance, a relatively large distance, a relatively small distance . . . from the left side to the right side in the drawing, for example. A region surrounded by a pair of drain signal lines DL which are arranged with a relatively large distance therebetween and the gate signal lines GL constitutes a pixel region and two pixels are formed in the pixel region.

That is, between the pixels which are arranged close to each other in the x direction in the drawing, there exists a portion where the drain signal lines DL run and a portion where the drain signal lines DL do not run. In the portion where the drain signal lines DL run, except for both sides, two drain signal lines DL run in a state that two drain signal lines DL are arranged close to each other and parallel to each other. Due to such a constitution, to the pixels which are arranged close to each other without having the drain signal lines DL in the boundary, signals are supplied from the drain signal lines DL which are arranged on respective sides opposite to the boundary side.

Further, in the respective pixel regions, counter voltage signal lines CL (CL1 to CLend) which run while traversing a group of pixels which are arranged in parallel in the x direction in the drawing are formed. The counter voltage signal lines CL are configured to supply signals to counter electrodes CT described later which are formed in the inside of the respective pixels and have both ends thereof connected in common. This provision is made to decrease the whole electric resistance of the counter voltage signal lines CL.

In the inside of each pixel region, there are provided two thin film transistors TFT which are turned on in response to a signal from one gate signal line GL (on a lower side in the drawing) out of the respective gate signal lines GL which surround the pixel region. This provision is adopted since two pixels are formed in the inside of the pixel region, wherein one thin film transistor TFT is allocated to the driving of one pixel and another thin film transistor TFT is allocated to the driving of another pixel.

In the drawing, the signal (video signal) from the drain signal lines DL which are arranged on the left side in the drawing is configured to be supplied to the pixel electrode PX through the thin film transistor TFT which is arranged on the left side in the drawing. On the other hand, the signal (video signal) from the drain signal lines DL which is arranged on the right side in the drawing is configured to be supplied to the pixel electrode PX through the thin film transistor TFT which is arranged on the right side in the drawing.

These respective pixel electrodes PX are configured to respectively generate an electric field between these pixel electrodes PX and the counter electrode CT which is formed in common in the inside of the pixel region, wherein a voltage signal which becomes the reference with respect to the above-mentioned video signal is supplied to the counter electrode CT through the above-mentioned counter voltage signal lines CL.

The respective gate signal lines GL are connected with a scanning circuit (scanning signal drive circuit) V and signals (scanning signals) are sequentially supplied to the respective gate signal lines GL from the scanning circuit V. Further, the respective drain signal lines DL are connected with a signal circuit (video signal drive circuit) He and signals (video signals) are supplied from the signal circuit He in conformity with the supply timing of the above-mentioned scanning signals.

These scanning circuit V and the signal circuit He are respectively controlled by a power source/controller in a state that the above-mentioned scanning signals and video signals are generated.

In the above-mentioned explanation, it is apparent that in the respective pixels in the liquid crystal display device of this embodiment, the respective pixels which are arranged close to each other have portions where the signal lines (gate signal lines GL, the drain signal lines DL) run and portions where the signal lines do not run in the boundaries thereof.

Figure 1:
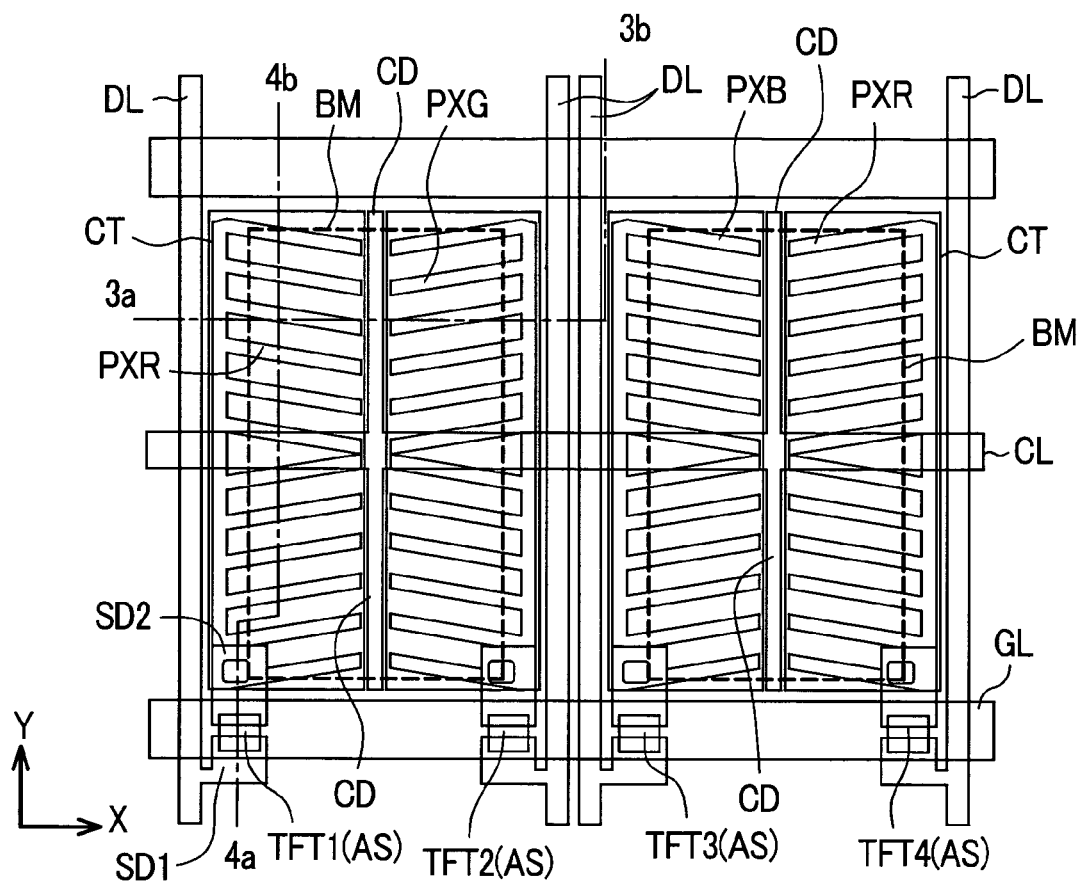
FIG. 1 is a plan view showing one embodiment of the constitution of pixels formed on one-substrate-side of a liquid crystal display device according to the invention.

FIG. 1 is a view showing two pixel regions which are arranged in parallel in the x direction among the respective pixel regions (pixel regions which are surrounded by the gate signal lines GL and the drain signal lines DL). In this case, as described above, each pixel region includes two pixels and hence, the four pixels in total are shown in the drawing. Since one pixel region has the same constitution as another pixel region, only the constitution of only one pixel region is explained in the explanation made hereinafter.

Figure 3:
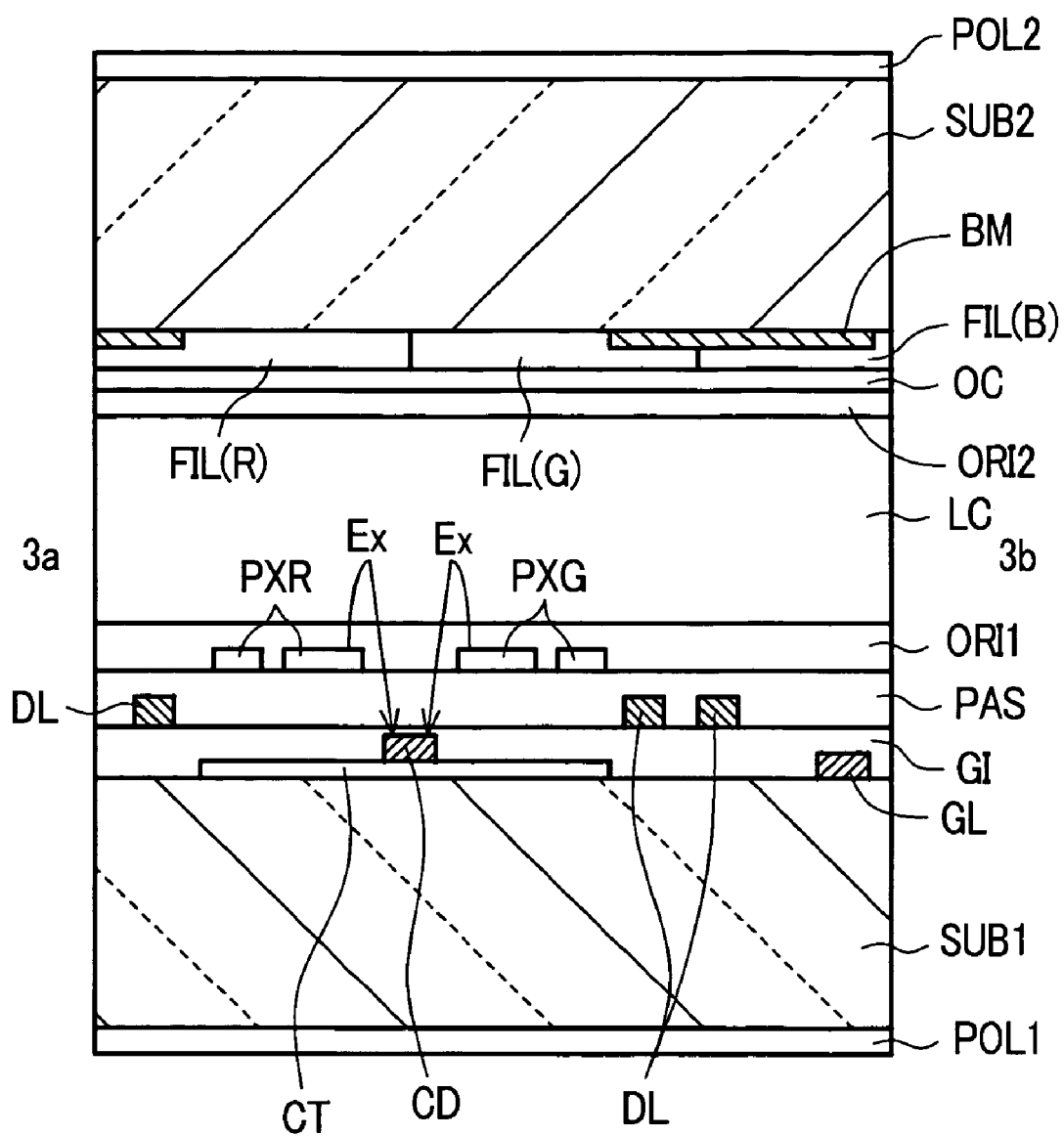
FIG. 3 is a cross-sectional view taken along a line 3a-3b in FIG. 1.
Figure 4:
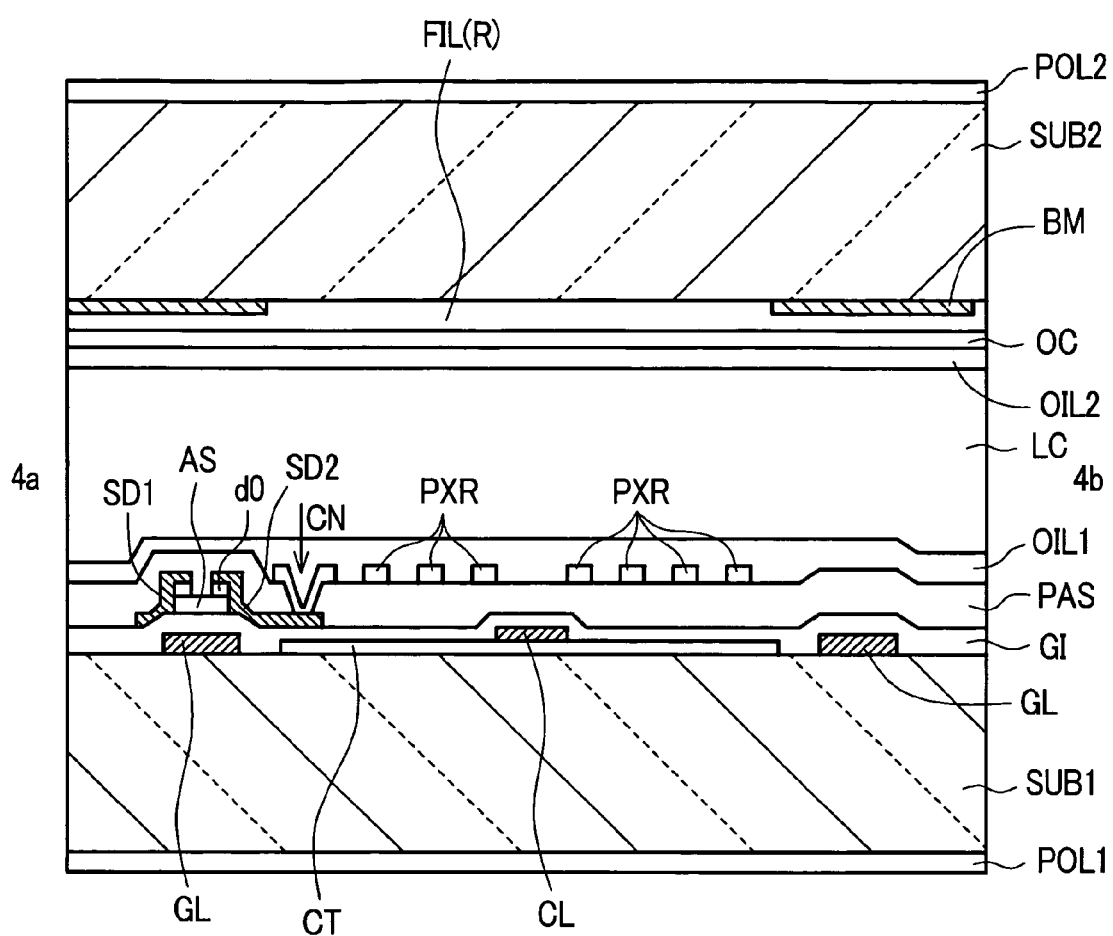
FIG. 4 is a cross-sectional view taken along a line 4a-4b in FIG. 1.

Here, FIG. 3 is a cross-sectional view taken along a line 3a-3b in FIG. 1 and FIG. 4 is a cross-sectional view taken along a line 4a-4b in FIG. 1.

First of all, on a surface of the transparent substrate SUB1, in the pixel regions which are formed in a state that the pixel regions are surrounded by the gate signal lines GL and the drain signal lines DL described later, the counter electrodes CT are formed in center portions except for trivial peripheral portions. The counter electrode CT is formed of a light-transmitting conductive layer made of, for example, ITO (Indium Tin Oxide), ITZO (Indium Tin Zinc Oxide), IZO (Indium Zinc Oxide), SnO (tin oxide) or $In_2O_3$ (indium oxide). This provision is made to enhance a so-called numerical aperture of the pixels.

Further, the gate signal lines GL are formed in a state that the gate signal lines GL extend in the x direction and are arranged in parallel in the y direction in the drawing. Further, at the substantially center of the gate signal lines GL which are arranged close to each other, the counter voltage signal line CL is formed in parallel to the gate signal lines GL. These gate signal lines GL and the counter voltage signal lines CL are, for example, formed in the same step and hence, these signal lines GL, CL are formed of the same material layer.

The counter voltage signal line CL is formed in a state that the counter voltage signal line CL is directly stacked on the counter electrodes CT and hence, the respective counter electrodes CT can establish the electrical connection with the counter voltage signal lines CL.

Here, the counter voltage signal line CL includes extremely fine extending portions which extend upwardly and downwardly in the y direction in the drawing from a center portion of the pixel region and these extending portions are formed to define two pixels which are formed in the inside of the pixel region. In other words, the extending portions are formed in the boundary of two pixels which are formed in a state that two pixels are sandwiched by the gate signal lines GL and the counter voltage signal line CL. A function of conductive layers CD which constitute the extending portions is described later. The conductive layers CD are formed integrally with the counter voltage signal line CL in the same step. Since a function of the portions of the counter voltage signal line CL which are arranged parallel to the drain signal lines DL is made different from the function of the counter voltage signal line CL, the portions are named as the conductive layer CD for the convenience's sake.

On the surface on which the counter voltage signal line CL is formed, an insulation film GI is formed in a state that the insulation film GI also covers the counter voltage signal line CL. The insulation film functions as a gate insulation film in a region where the thin film transistor TFT described later is formed.

Further, on an upper surface of the insulation film, amorphous semiconductor layers AS are formed in a state that the semiconductor layers AS are overlapped to the gate signal line GL. Two separate semiconductor layers AS are respectively formed on left and right sides of the pixel region. This provision is made to form the thin film transistors TFT (TFT1, TFT2) in the respective portions.

In these thin film transistors TFT, by forming a drain electrode SD1 and a source electrode SD2 on each semiconductor layer AS, an MIS (Metal Insulator Semiconductor) transistor having the so-called inverse staggered structure is formed. Here, the drain electrode SD1 and the source electrode SD2 are respectively formed simultaneously at the time of forming the drain signal lines DL.

That is, the drain signal lines DL which extend in the y direction and are arranged in parallel in the x direction in the drawing are formed. The arrangement of these drain signal lines DL is as set forth above, wherein two pixels are sandwiched by the drain signal line DL and another drain signal line DL which supply signals to the respective pixels.

In this case, the constitution of the thin film transistor TFT and the pixel electrode PX in one pixel is arranged in the axial symmetry with those of another pixel with respect to the boundary between these pixels and hence, the thin film transistor TFT and the pixel electrode PX in one pixel side are explained hereinafter.

In one pixel, a portion of the drain signal line DL which is arranged close to one pixel is extended and the extending portion is formed on an upper surface of the semiconductor layer AS thus forming the above-mentioned drain electrode SD1. Further, the above-mentioned source electrode SD2 which is arranged to face the drain electrode SD1 in an opposed manner is formed on an upper surface of the semiconductor layer AS, wherein the source electrode SD2 is slightly extended to the pixel side thus forming a contact portion which is connected with the pixel electrode PX described later.

On the surface on which the drain signal lines DL, the drain electrodes SD1 and the source electrodes SD2 are formed, a protective film PAS is formed in a state that the protective film PAS also covers these components. The protective film PAS is configured to avoid the direct contact of the above-mentioned thin film transistors TFT with the liquid crystal thus preventing the deterioration of properties of the thin film transistors TFT.

Then, the pixel electrodes PX are formed on an upper surface of the protective film. The pixel electrodes PX are formed of the light-transmitting conductive layer made of, for example, ITO (Indium Tin Oxide), ITZO (Indium Tin Zinc Oxide), IZO (Indium Zinc Oxide), $SnO_2$ (tin oxide), $In_2O_3$ (indium oxide) or the like. This provision is made to enhance a so-called numerical aperture.

Further, portions of the pixel electrodes PX are connected with the contact portions of the source electrodes SD2 of the above-mentioned thin film transistors TFT through contact holes CN which are preliminarily formed in the above-mentioned protective film PAS.

The pixel electrode PX is constituted of a group consisting of a plurality of electrodes which are arranged in parallel along the y direction in the drawing, wherein these respective electrodes are connected with each other on sides thereof along the drain signal line DL which supplies the video signals to the thin film transistors TFT which are connected to the electrodes thus forming a comb-teeth-shaped pattern.

Further, the respective end portions of the respective electrodes of the pixel electrode PX on a side opposite to the side where the respective electrodes of the pixel electrode PX are connected with each other are extended close to the boundary portion between the pixel and the neighboring pixel whereby the respective end portions are formed close to the above-mentioned conductive layers CD which constitute the extending portions of the counter voltage signal line CL.

The close extension of the pixel electrode PX of the pixel to another neighboring pixel side can be realized by the presence of the above-mentioned conductive layers CD.

That is, assuming a case in which the conductive layers CD are not formed, when the pixel electrode PX of the pixel is extended close to another neighboring pixel side, it is difficult to avoid the generation of an electric field between the pixel electrode PX and the counter electrode CT of another pixel thus giving rise to a drawback that the division of the displays of respective pixels becomes indefinite in the boundary between the neighboring pixels. Accordingly, when the above-mentioned conductive layers CD are not present, the arrangement of the pixel electrode PX to the neighboring another pixel side is restricted and hence, it is difficult to deny that the enhancement of the numerical aperture of the pixel is limited.

Accordingly, the above-mentioned conductive layers CD are provided as described above, wherein the conductive layers CD are electrically connected with the counter electrode CT and, at the same time, a height of a surface of the conductive layers CD from the substrate SUB1 is set higher than a height of a surface of the counter electrode CT from the substrate SUB1. Using lines of electric forces Ex shown in FIG. 3, a state that the electric fields are concentrated is expressed.

That is, with respect to the portions of the pixel electrode PX which are arranged close to another pixel, a portion where the electric fields are generated in a concentrated manner is formed by the conductive layers CD at portions which are distantly closer than the counter electrode CT of another pixel so as to avoid the generation of the electric field between the pixel electrode PX and the counter electrode CT of another pixel.

Accordingly, it is possible to make the division of the display of the respective pixels clear in the boundary of the neighboring pixels and hence, the pixel electrode PX can be arranged close to the pixel electrode PX of the neighboring another pixel whereby the numerical aperture of the pixel can be enhanced.

Here, the respective electrodes of the pixel electrode PX are extended with an inclination with respect to the x direction in the drawing, wherein the inclination has, in the pixel region which is surrounded by the drain signal lines DL, respective different gradients with the axially symmetrical relationship with respect to the counter voltage signal line CL and the conductive layers CD which constitute the extending portions of the counter voltage signal line CL. This provision is provided for obtaining a so-called multi-domain effect.

Further, on a surface on which these pixel electrodes PX are formed, an orientation film OIL1 is formed in a state that the orientation film OIL1 also covers the pixel electrodes PX. The orientation film OIL1 is configured to be directly brought into contact with the liquid crystal LC and decides the initial orientation of molecules of the liquid crystal LC.

Here, on a liquid-crystal-side surface of the transparent substrate SUB2 which is arranged to face the transparent substrate SUB1 with the liquid crystal therebetween, black matrixes BM are formed. The black matrix BM is formed in a state that the black matrix BM forms two pixels surrounded by the drain signal line DL into one unit and defines them from another neighboring pixel region. In other words, two pixels which are arranged close to each other can be observed through an opening portion (one aperture portion) of the black matrix BM with naked eyes and the boundary between two pixels is not defined by the black matrix BM. The opening portion of the above-mentioned black matrix BM is described in an overlapped manner in FIG. 1 and is indicated by a bold chain line.

Further, color filters FIL are formed over the opening portion of the black matrix BM in a state that the color filters FIL also cover the black matrix BM. The color filters FIL are formed in a state that the color filters FIL differ in color at left and right sides of the boundary portion of the above-mentioned two pixels.

Figure 2:
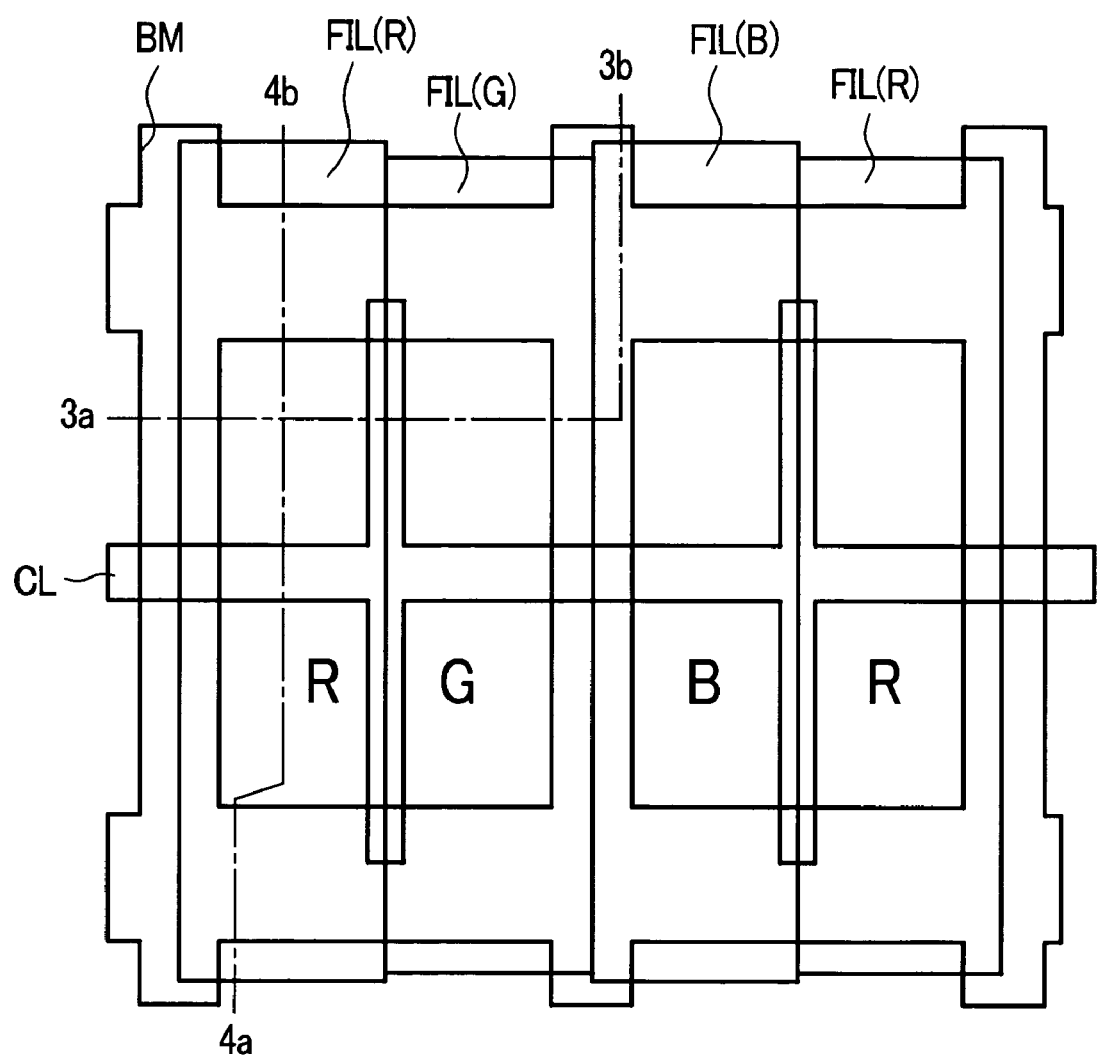
FIG. 2 is a plan view showing one embodiment of the constitution of pixels formed on another-substrate-side of a liquid crystal display device according to the invention.

FIG. 2 shows four pixels which are arranged in parallel in the x direction, wherein two pixels on the left side in the drawing and two pixels on the right side in the drawing can be observed with naked eyes through the respective opening portions formed in the black matrix BM. Further, corresponding to the respective pixels, the color filters FIL of red (R), green (G), blue (B) and red (R) are formed in order from the left-side pixel in the drawing.

In this case, although it is preferable that the respective color filters FIL which differ in color from each other in two pixels surrounded by the drain signal lines DL are formed in a state that the color filters FIL are not overlapped to each other, it is unavoidable that the color filters FIL are formed with a slight overlapping. However, even in such a case, since the color filters FIL are arranged in the inside of a portion which faces the above-mentioned conductive layer CD which constitutes the extending portion of the counter voltage signal line CL, the light shielding is achieved whereby the drawback can be obviated.

On a surface on which the color filters FIL are formed, a leveling film OC is formed and an orientation film ORI2 is formed on an upper surface of the leveling film OC.

Figure 6:
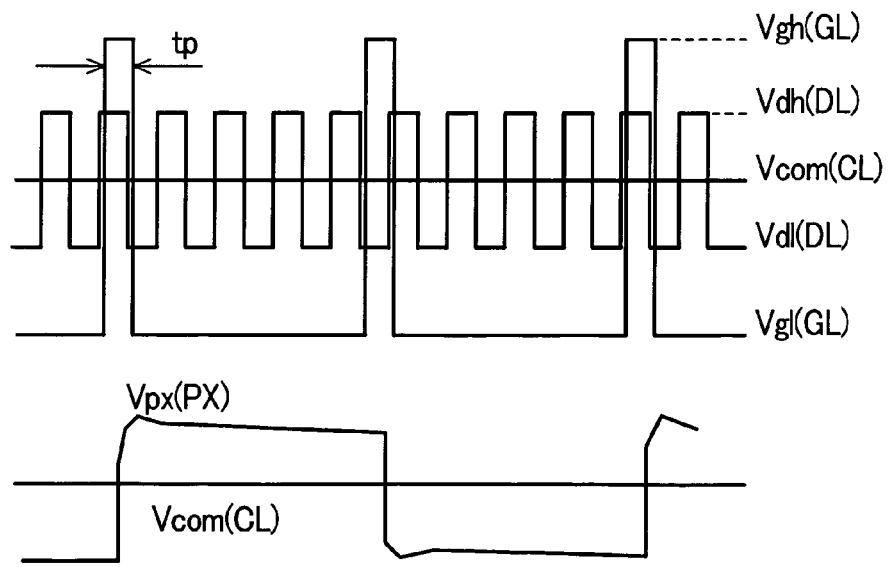
FIG. 6 is a view showing signals which drive the liquid crystal display device according to the invention.

FIG. 6 is a view showing respective signals at the time of driving the liquid crystal display device having the above-mentioned constitution. In an upper-side view of FIG. 6, an ON signal Vgl (GL) and an OFF signal Vgh (GL) of the scanning signal supplied to the gate signal line GL and a "High" signal Vdh and "Low" signal Vdl of the video signal supplied to the drain signal lines DL (having a voltage difference depending on gray scales in an actual operation) are shown. Further, in a lower-side view of FIG. 6, a pixel voltage Vpx (PX) applied to the pixel electrode PX is shown. Here, in the drawing, Vcom (CL) indicates a counter voltage supplied to the counter electrode CT.

Embodiment 2

In the above-mentioned embodiment, there is described the constitution in which two pixels are arranged in the pixel region which is surrounded by the gate signal lines GL and the drain signal lines DL. In the embodiment described hereinafter, the constitution which arranges four pixels in the pixel region is described.

Figure 11:
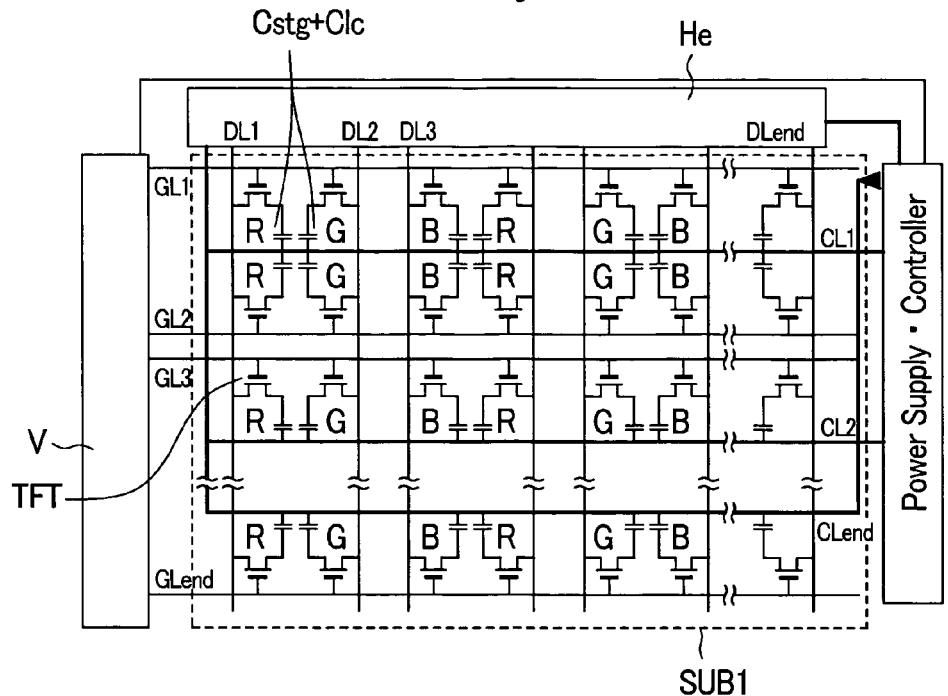
FIG. 11 is a view showing another embodiment of an equivalent circuit of the liquid crystal display device according to the invention.

That is, FIG. 11 is an equivalent circuit diagram showing another embodiment of the liquid crystal display device according to the invention and correspondence to FIG. 5.

The constitution which makes this embodiment 2 different from the embodiment shown in FIG. 5 lies in, first of all, gate signal lines GL (GL1 to GLend), wherein these gate signal lines GL are arranged from an upper side to a lower side in the drawing in order of a relatively large distance, a relatively small distance, a relatively large distance, a relatively small distance, . . . , for example.

On the other hand, the respective drain signal lines DL (DL1 to DLend) are arranged at intervals, in the same manner as the embodiment shown in FIG. 5, in order of a relatively large distance, a relatively small distance, a relatively large distance, a relatively small distance, . . . from the left side to the right side in the drawing, for example. Accordingly, in a region having a relatively large area which is surrounded by a pair of neighboring gate signal lines GL and a pair of drain signal lines DL, four pixels can be provided.

Figure 7:
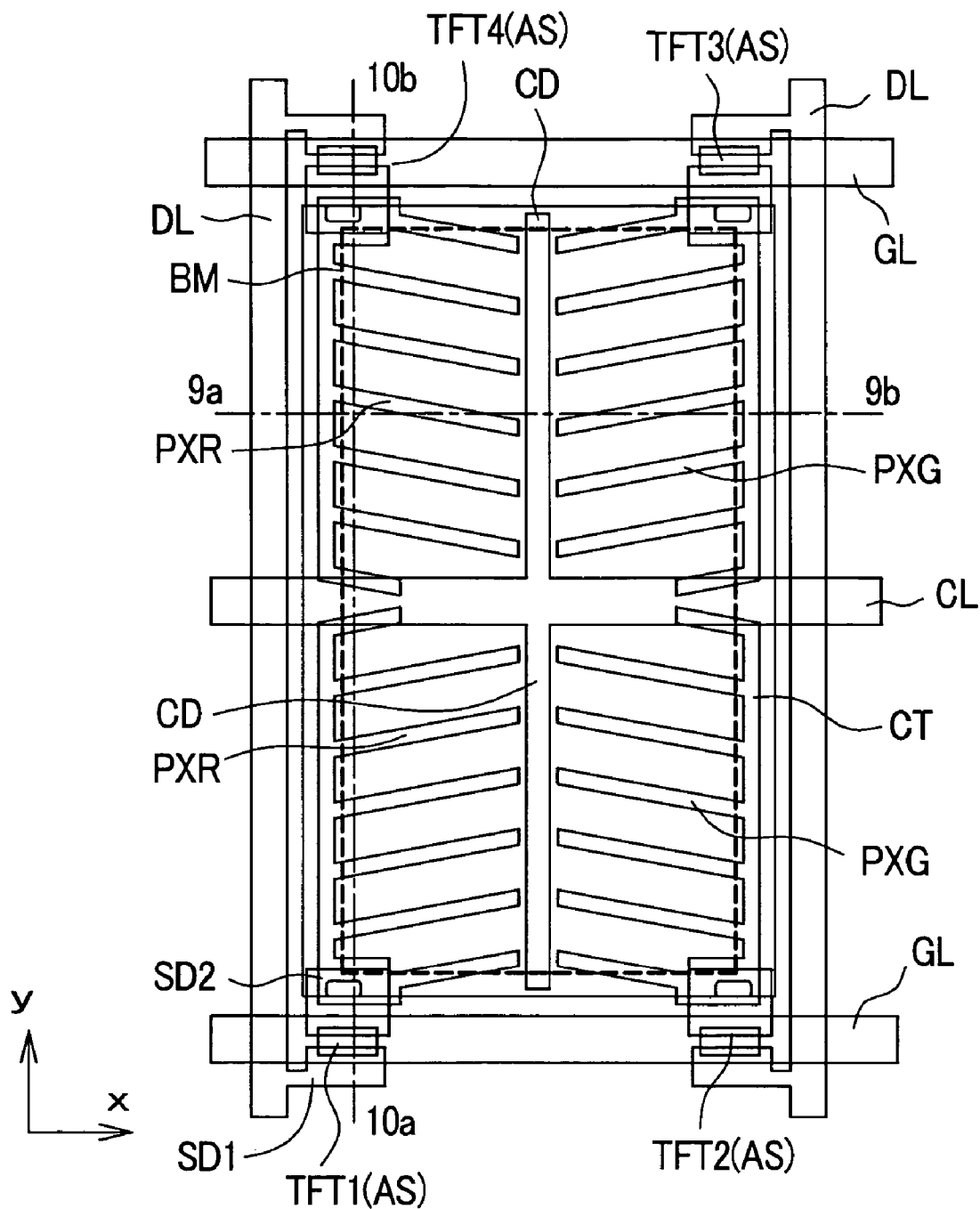
FIG. 7 is a plan view showing another embodiment of the constitution of pixels formed on another-substrate-side of the liquid crystal display device according to the invention.

FIG. 7 is a plan view showing one embodiment of four pixels which are arranged close to each other and corresponds to FIG. 1. Here, FIG. 9 is a cross-sectional view taken along a line 9a-9b in FIG. 7 and FIG. 10 is a cross-sectional view taken along a line 10a-10b in FIG. 7.

Figure 9:
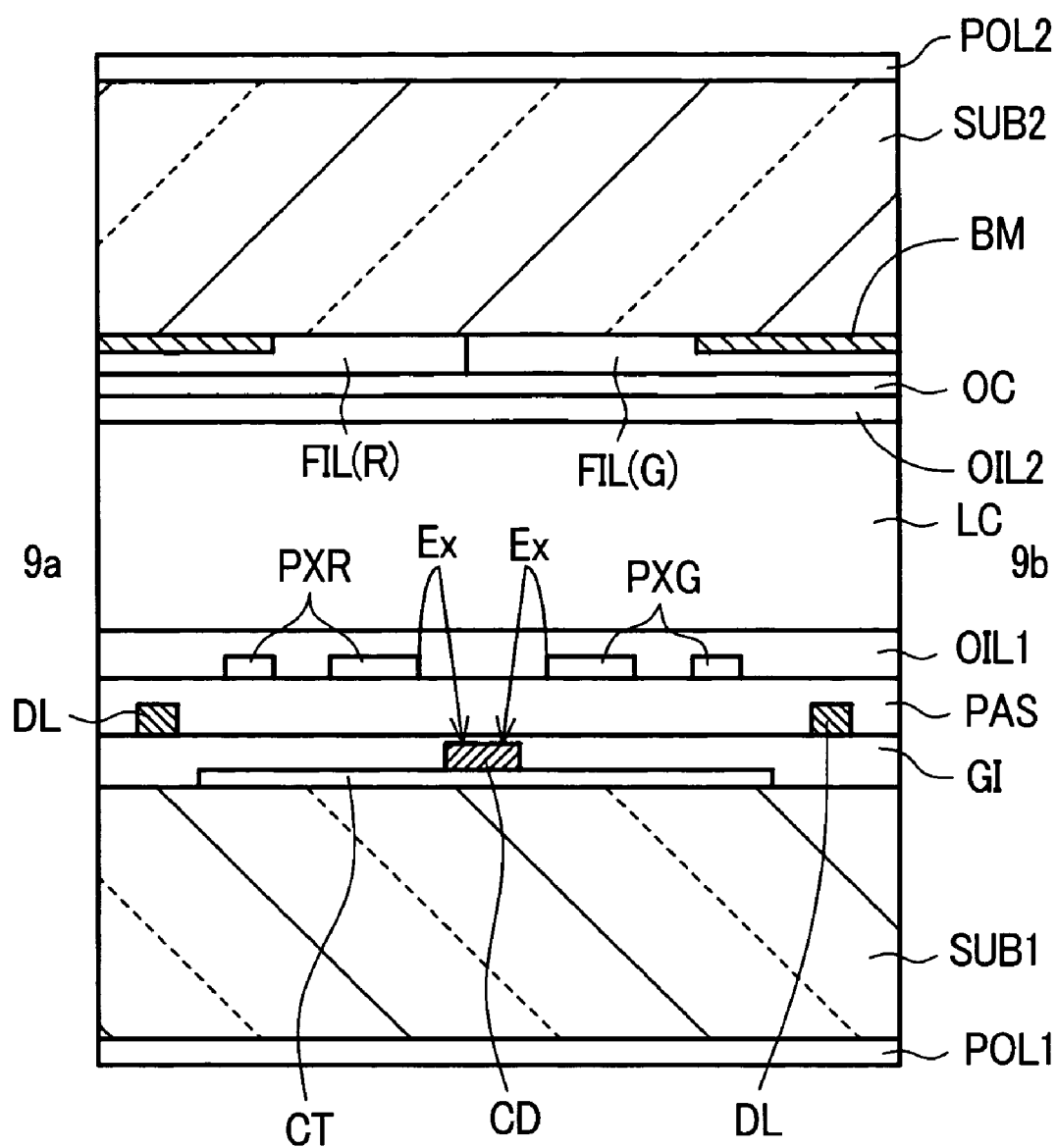
FIG. 9 is a cross-sectional view taken along a line 9a-9b in FIG. 7.
Figure 10:
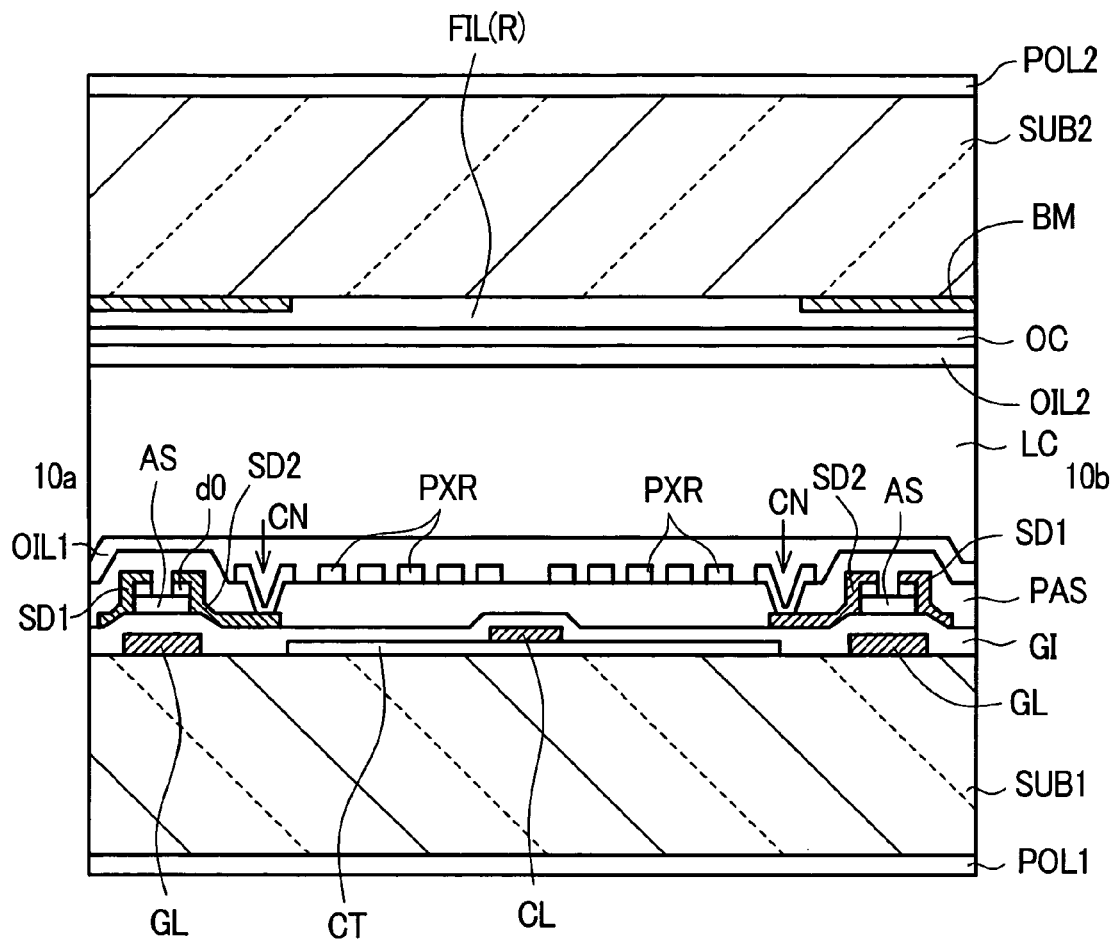
FIG. 10 is a cross-sectional view taken along a line 10a-10b in FIG. 7.

As can be clearly understood from FIG. 9 and FIG. 10, in the same manner as the embodiment 1, this embodiment adopts the layer structure in which, from a surface side of a transparent substrate SUB1, counter electrodes CT, gate signal lines GL and counter voltage signal lines CL, an insulation film GI, drain signal lines DL, drain electrodes SD1 and source electrodes SD2, a protective film PAS, pixel electrodes PX and an orientation film POLL are sequentially formed.

In view of the above-mentioned constitution, the layers having the above-mentioned respective functions have portions thereof formed with planer patterns different from each other.

In FIG. 7, in a pixel region which is surrounded by a pair of gate signal lines GL and a pair of drain signal lines DL, respective pixels are formed at a left upper portion, a left lower portion, a right upper portion and a right lower portion respectively.

The left-upper pixel is configured to be driven in response to a signal supplied from the left-side drain signal line DL by way of a thin film transistor TFT4 which is formed on a left side above the upper-side gate signal line GL and is driven by the gate signal line GL. The left-lower pixel is configured to be driven in response to a signal supplied from the left-side drain signal line DL by way of a thin film transistor TFT1 which is formed on a left side above the lower-side gate signal line GL and is driven by the gate signal line GL. The right-upper pixel is configured to be driven in response to a signal supplied from the right-side drain signal line DL by way of a thin film transistor TFT3 which is formed on a right side above the upper-side gate signal line GL and is driven by the gate signal line GL. Further, the right-lower pixel is configured to be driven in response to a signal supplied from the right-side drain signal line DL by way of a thin film transistor TFT2 which is formed on a right side above the lower-side gate signal line GL and is driven by the gate signal line GL.

The counter electrode CT is formed in the pixel region surrounded by the pair of gate signal lines GL and the pair of drain signal line DL except for a trivial peripheral portion of the pixel region.

The counter voltage signal line CL which runs at the center of the pixel region in the x direction is formed, wherein the counter voltage signal line CL is directly formed on the counter electrode CT thus establishing the electrical connection with the counter electrode CT. Here, the counter voltage signal line CL is formed in a state that the counter voltage signal line CL extends over the pixel region which is arranged close to the pixel region in the x direction and is connected with the counter electrodes CT of these pixel regions in the same manner as the embodiment 1.

Further, the counter voltage signal line CL includes, in the same manner as the embodiment 1, conductive layers CD formed of extremely fine extending portions which extend upwardly and downwardly in the y direction in the drawing from the center of the pixel region. The conductive layers CD are arranged to divide the left-upper pixel and the right-upper pixel as well as the left-lower pixel and the right-lower pixel in the drawing respectively.

As described in the explanation of the embodiment 1, a height of the surface of the conductive layer CD from the transparent substrate SUB1 is set higher than the height of the surface of the counter electrode CT from the transparent substrate SUB1. Accordingly, it is possible to obviate a drawback which is caused by forming a portion of the pixel electrode PX which is formed on a surface of the protective film PAS close to the conductive layers CD.

Due to such a provision, it is possible to arrange the left and right pixel electrodes PX close to each other using the above-mentioned conductive layers CD as a boundary thus enhancing the numerical aperture of the pixel.

The pixel electrodes PX formed on the protective film PAS are formed in an electrically separated manner from each other in four respective pixels and are connected with the thin film transistors TFT of the pixels.

The pixel electrode PX of one pixel is formed of a group of electrodes constituted of a plurality of electrodes which extend in the x direction and are arranged in parallel in the y direction in the drawing, wherein these electrodes form a comb-teeth-shaped pattern in which end portions of the respective electrodes which are arranged on a side of the drain signal line DL which supplies the video signal to the thin film transistors TFT are connected in common.

Further, the end portions of the respective electrodes on a side opposite to the side where the respective electrodes are connected in common are extended to a position where the end portions are arranged close to the conductive layers CD which are formed of the extending portions extended in the y direction in the drawing from the counter voltage signal line CL whereby an area occupied by the pixel can be effectively expanded.

Further, the respective electrodes of the pixel electrode PX are formed with a slight inclination with respect to the gate signal line GL, while the respective electrodes of the pixel electrode PX of another pixel are configured to have the inclination which respectively differ from the inclination of the respective electrodes of the pixel electrode PX of the pixel to establish the axially symmetrical relationship with respect to the counter voltage signal line CL or the conductive layers CD which constitute the extending portions of the counter voltage signal line CL. This provision is made to obtain a sufficient so-called multi-domain effect.

Here, the counter voltage signal line CL is, in this embodiment, arranged to run at the center of the pixel region (the region surrounded by the pair of gate signal lines GL and the pair of drain signal lines DL) and hence, the counter voltage signal line CL performs the substantially equal function as the conductive layers CD which constitute the extending portions of the counter voltage signal line CL. The counter voltage signal line CL also has a function of defining two pixels which are arranged on one side out of both sides and two pixels which are arranged on another side out of both sides.

However, the counter voltage signal line CL is not always formed for the purpose of defining the pixels. That is, as another embodiment, the counter voltage signal line CL may be arranged close to one-gate-signal-line GL side.

In this case, four pixels are formed in the inside of the region which is defined by the pair of drain signal lines DL, one gate signal line GL and the counter voltage signal line CL and hence, four pixels are arranged without being defined by the counter voltage signal line CL.

Further, when the counter voltage signal line CL is arranged close to one-gate-signal-line GL side, to decrease the distance between the pixel electrode PX of the left-upper pixel and the pixel electrode PX of the left-lower pixel in the drawing and, at the same time, to decrease the distance between the pixel electrode PX of the right-upper pixel and the pixel electrode PX of the right-lower pixel in the drawing, the conductive layers CD are provided in boundaries between them and also between the layer on which the respective pixel electrodes PX are formed and the transparent substrate SUB1 (as a result, the conductive layers CD being formed in a cruciform pattern), the conductive layers CD are electrically connected with the counter electrodes CT, and the height of the surface of the conductive layers CD from the transparent substrate SUB1 is set higher than the height of the surface of the counter electrode CT from the transparent substrate SUB1. The conductive layers CD may be specifically constituted as the extending portions of the counter voltage signal line CL (the counter voltage signal line CL which is arranged close to one gate signal line CL) and may be constituted in a state that the conductive layers CD are physically separated from the counter voltage signal lines CL.

Figure 8:
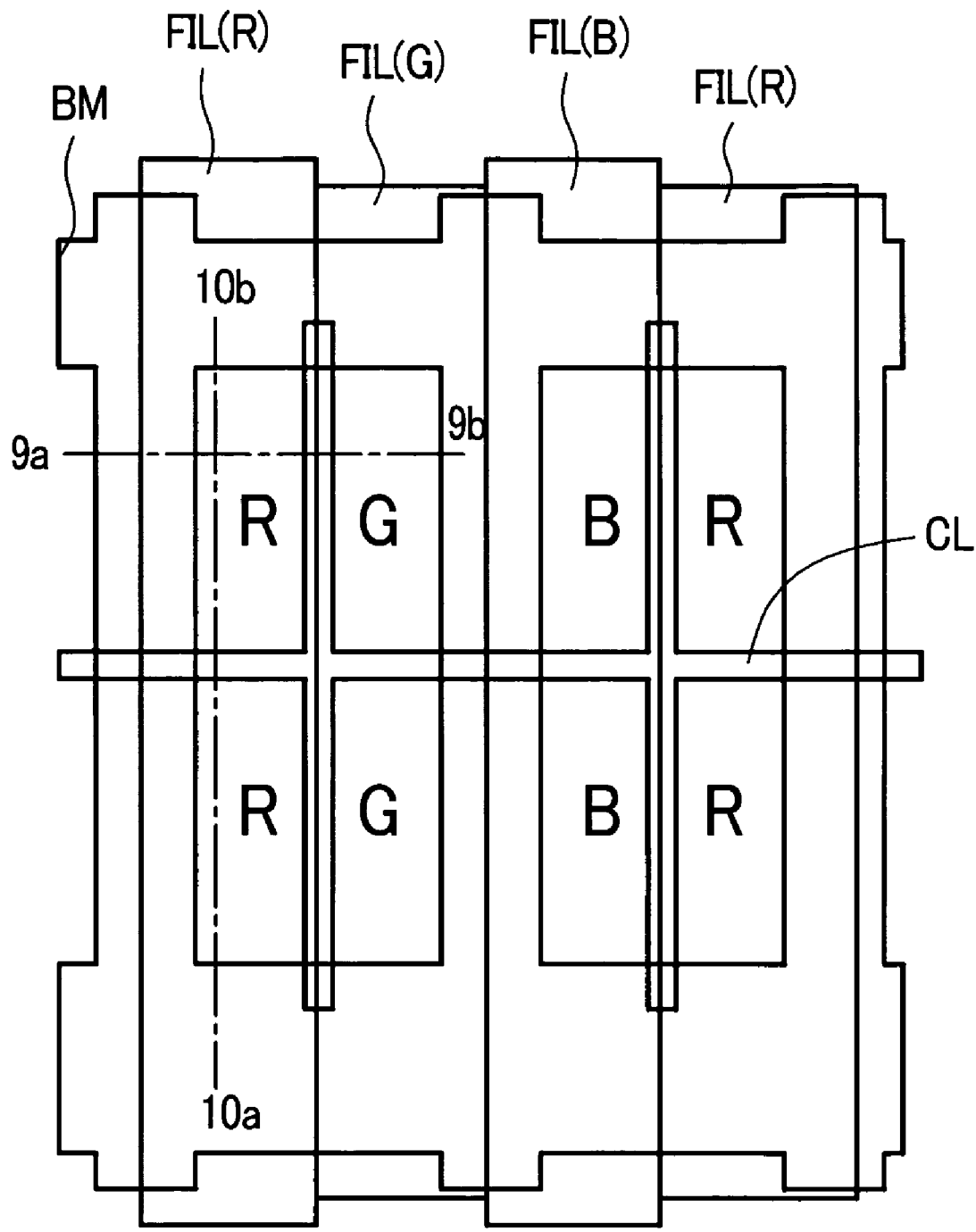
FIG. 8 is a plan view showing another embodiment of the constitution of pixels formed on another-substrate-side of the liquid crystal display device according to the invention.

FIG. 8 is a plan view in which the black matrix BM and color filters FIL which are formed on the transparent substrate SUB2 side are depicted by overlapping these components with the pixel in the pixel constitution shown in FIG. 7.

From one opening of the black matrix BM, four pixels which are surrounded by the pair of drain signal lines DL and the pair of gate signal lines GL are exposed. Further, the color filters FIL have the common color among the pixels which are arranged in parallel in the y direction in the drawing and are sequentially arranged in the left side to the right side in the drawing in the x direction in which colors are allocated to the respective pixels in order of red (R), green (G), blue (B), red (R), . . . .

In any one of the above-mentioned embodiments, the unit pixel of the color display is constituted of three pixels and the color filters FIL of the respective pixels are set to red (R), green (G) and blue (B).

However, it is needless to say that the unit pixel of the color display is constituted of four pixels and the color filters FIL of the respective pixels may be configured to include a filter which is not provided with color (referred to as a white (W) color filter FIL for the sake of conveniences in this embodiment) besides the above-mentioned color filters.

Figure 12:
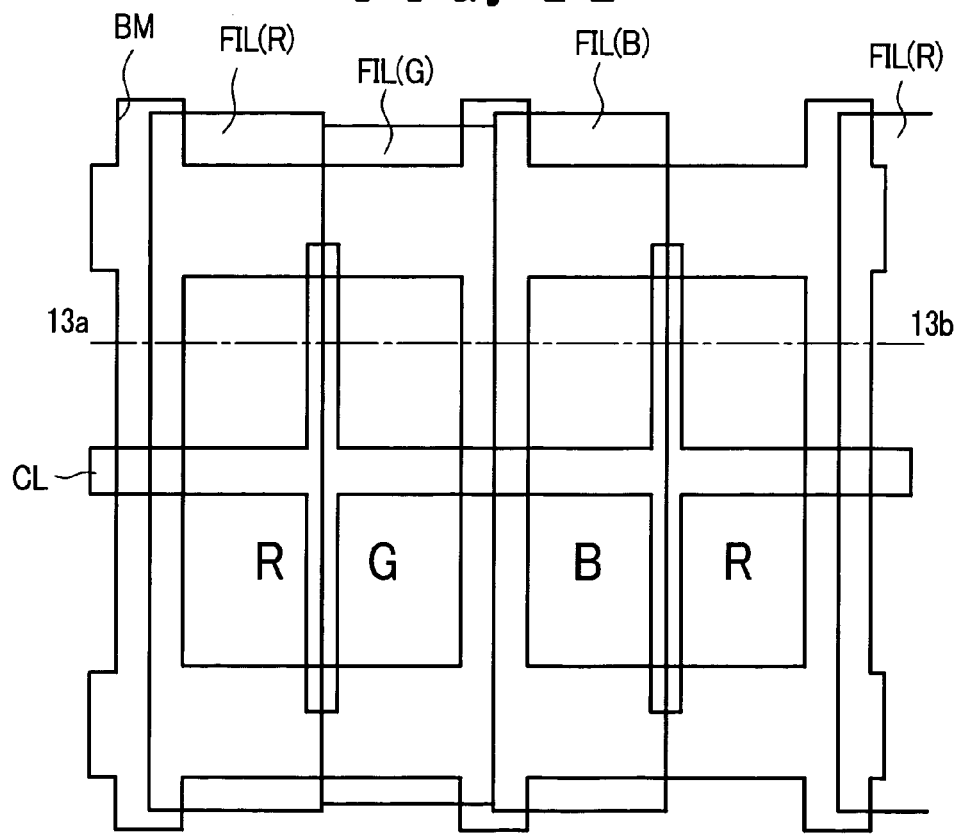
FIG. 12 is a plan view showing another embodiment of the constitution of pixels formed on another-substrate-side of the liquid crystal display device according to the invention.

FIG. 12 corresponds to FIG. 2. In FIG. 12, to four pixels which are arranged in parallel in the x direction in the drawing, that is, to the respective pixels which are arranged close to each other in the x direction and are exposed from the opening formed in the black matrix, the respective color filters FIL of red (R), green (G), blue (B) and white (W) are overlapped from the left side to the right side in the drawing, for example.

Figure 13:
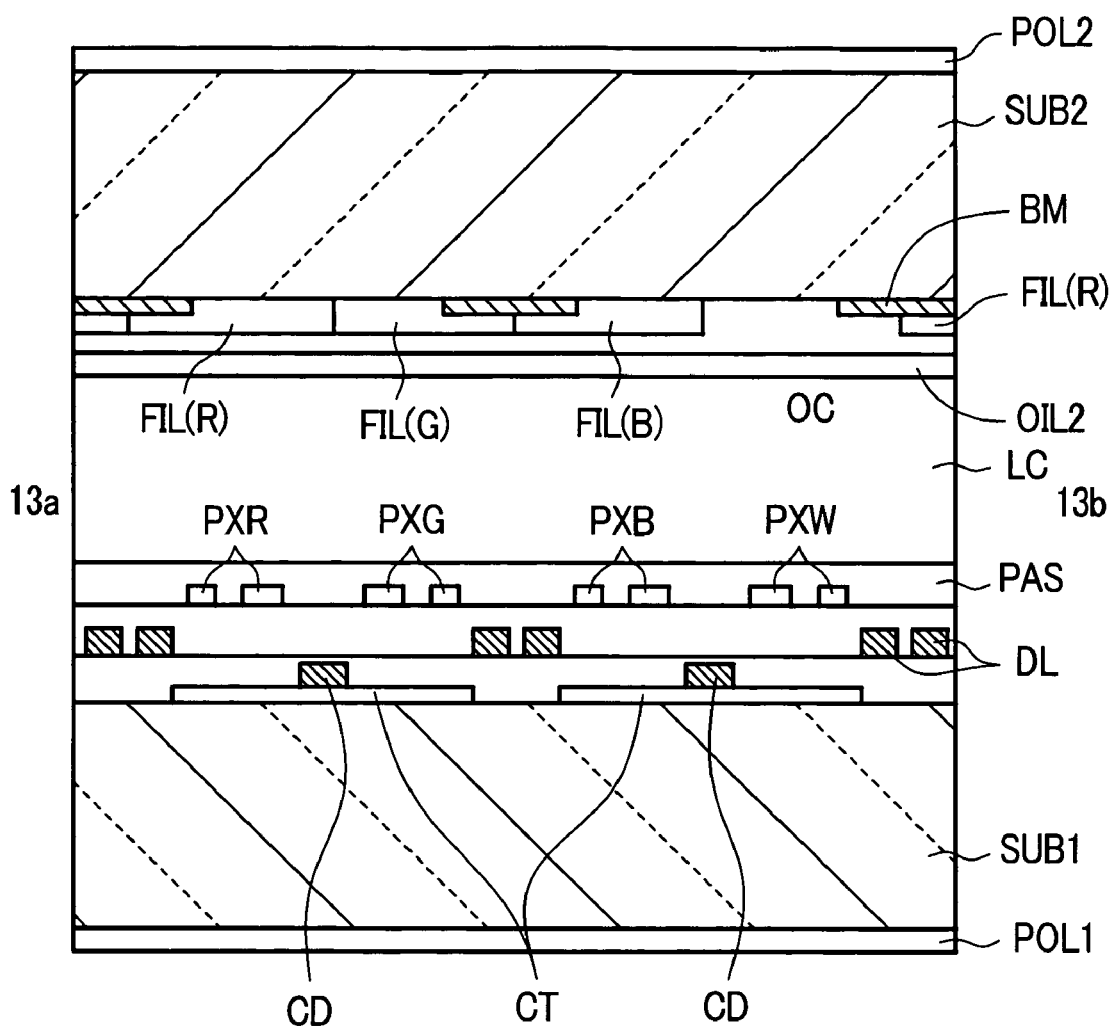
FIG. 13 is a cross-sectional view taken along a line 13a-13b in FIG. 12.

FIG. 13 is a cross-sectional view taken along a line 13a-13b in FIG. 12. From the drawing, it is apparent that on a liquid-crystal-side surface of the transparent substrate SUB2 and, at the same time, at a portion where the above-mentioned white (W) color filter FIL is formed on the surface on which the respective color filters FIL of red (R), green (G), blue (B) are formed, the color filter FIL is not formed.

Figure 14:
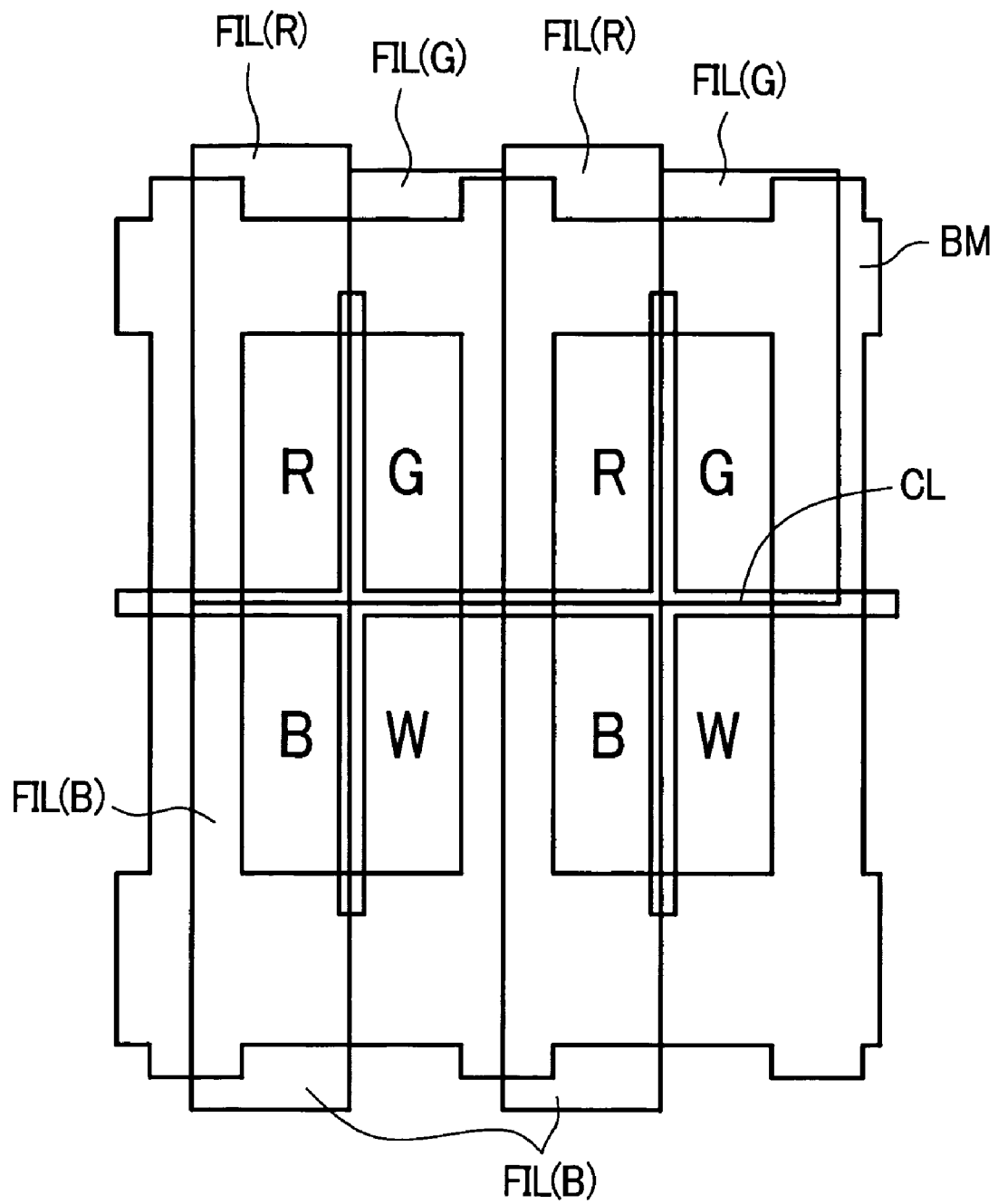
FIG. 14 is a plan view showing another embodiment of the constitution of pixels formed on another-substrate-side of the liquid crystal display device according to the invention.

Further, FIG. 14 corresponds to FIG. 8. In FIG. 14, the respective color filters FIL of red (R), green (G), blue (B) and white (W) are allocated to four respective pixels which are exposed from one opening formed in the black matrix BM.

In this case, these respective pixels constitute the unit pixel for color display and are arranged close to each other without being defined by the black matrix BM whereby it is possible to obtain an advantageous effect that the color mixing in the unit pixel can be reliably prevented.

Here, in the above-mentioned respective embodiments, the counter voltage signal line CL and the conductive layers CD which constitute the extending portions of the counter voltage signal line CL are overlapped to the counter electrode CT. However, it is needless to say that the counter electrode CT may be formed at the portions where the conductive layers CD are formed in a physically separated manner.

In this case, although the conductive layers CD are not formed on the counter electrode CT, by forming the conductive layers CD such that the height of the surfaces of the conductive layers CD from the surface of the transparent substrate SUB1 is set larger than the height of the surface of the counter electrode CT from the surface of the transparent substrate SUB1, it is possible to obtain the advantageous effects of the invention.

Further, in the above-mentioned respective embodiments, the counter voltage signal line CL and the conductive layers CD which constitute the extending portions of the counter voltage signal lines CL are directly overlapped to the counter electrode CT. However, it is needless to say that an insulation film may be interposed between the counter electrode CT and the counter voltage signal line CL and the conductive layers CD which constitute the extending portions of the counter voltage signal line CL. This is because that the height of the surfaces of the conductive layers CD from the surface of the transparent substrate SUB1 is set larger than the height of the surface of the counter electrode CT from the surface of the transparent substrate SUB1 and hence, the advantageous effects of the invention can be obtained in the same manner.

The above-mentioned respective embodiments can be used independently from each other or in combination. This is because that the advantageous effects of the respective embodiments can be obtained independently or synergistically.

The invention claimed is:

1. A liquid crystal display device comprising:
pixels which are arranged close to each other without having a signal line in a boundary on a substrate, and
a counter electrode, an insulation layer and a pixel electrode which generates an electric field between the pixel electrode and the counter electrode which are sequentially stacked in each pixel,
wherein the pixel electrode is constituted of a plurality of electrodes which are arranged in parallel in a state that the pixel electrodes are overlapped to the counter electrode and include portions which are arranged close to the pixel electrode of another pixel which is arranged close to the pixel,
a conductive layer is provided in a boundary portion of the pixels arranged close to each other and between a layer on which the pixel electrode is formed and the substrate,
the conductive layer is electrically connected with the counter electrode and a height of a surface of the conductive layer from the substrate is set higher than a height of a surface of the counter electrode from the substrate,
two pixels which are arranged close to each other are provided to a region which is surrounded by a pair of drain signal lines and a pair of gate signal lines, and
a counter voltage signal line is provided between a pair of gate signal lines and in parallel with the gate signal lines, the counter voltage signal line is formed over the counter electrode, and the conductive layer is formed of an extending portion of the counter voltage signal line.

2. A liquid crystal display device comprising:
pixels which are arranged close to each other without having a signal line in a boundary on a substrate, and
a counter electrode, an insulation layer and a pixel electrode which generates an electric field between the pixel electrode and the counter electrode which are sequentially stacked in each pixel,
wherein the pixel electrode is constituted of a plurality of electrodes which are arranged in parallel in a state that the pixel electrodes are overlapped to the counter electrode and include portions which are arranged close to the pixel electrode of another pixel which is arranged close to the pixel,
a conductive layer is provided in a boundary portion of the pixels arranged close to each other and between a layer on which the pixel electrode is formed and the substrate,
the conductive layer is electrically connected with the counter electrode and a height of a surface of the conductive layer from the substrate is set higher than a height of a surface of the counter electrode from the substrate,
four pixels which are arranged close to each other are provided to a region which is surrounded by a pair of drain signal lines and a pair of gate signal lines, and
a counter voltage signal line is provided between a pair of gate signal lines and in parallel with the gate signal lines, the counter voltage signal line is directly formed over the counter electrode, four pixels are defined into two groups each consisting of two pixels, and the conductive layer which is formed of an extending portion of the counter voltage signal line is formed in a boundary between two pixels of each group.

* * * * *